United States Patent [19]

Filipovich

[11] Patent Number: 4,653,879
[45] Date of Patent: Mar. 31, 1987

[54] COMPACT SEE-THROUGH NIGHT VISION GOGGLES

[75] Inventor: Danny Filipovich, Lincolnwood, Ill.

[73] Assignee: FJW Industries, Inc., Mt. Prospect, Ill.

[21] Appl. No.: 707,224

[22] Filed: Mar. 1, 1985

[51] Int. Cl.[4] .................. G02B 23/04; G02B 23/12
[52] U.S. Cl. .................... 350/538; 350/1.2; 350/557
[58] Field of Search .......... 350/1.2, 508, 538, 557, 350/569, 547–549; 250/213 VT, 342; 356/51, 254–255; 244/3.16, 3.17

[56] References Cited

U.S. PATENT DOCUMENTS

| | | | |
|---|---|---|---|
| 3,257,904 | 6/1966 | Scidmore et al. | 350/541 |
| 3,409,343 | 11/1968 | Zapp | 350/569 |
| 3,443,105 | 5/1969 | Scidmore et al. | 250/213 VT |
| 3,450,480 | 6/1969 | Chitayat | 350/514 |
| 3,464,757 | 9/1969 | Schmidt et al. | 350/557 |
| 3,500,048 | 3/1970 | Menke | 250/342 |
| 3,781,560 | 12/1973 | DeBurgh et al. | 250/333 |
| 4,028,544 | 6/1977 | Jourdan et al. | 244/3.16 |
| 4,037,921 | 7/1977 | Cox | 350/36 |
| 4,076,978 | 2/1978 | Brennan | 350/538 |
| 4,145,142 | 3/1979 | Mikeman | 250/213 VT |
| 4,183,482 | 1/1980 | Jozwiak | 250/342 |
| 4,232,222 | 11/1980 | Deltrap | 250/333 |
| 4,266,129 | 5/1981 | Versteeg et al. | 250/330 |
| 4,361,378 | 11/1982 | Freeman | 350/36 |
| 4,376,889 | 3/1983 | Swift | 250/213 VT |
| 4,454,322 | 7/1969 | Scidmore et al. | 350/503 |
| 4,463,252 | 7/1984 | Brennan et al. | 250/213 VT |
| 4,467,190 | 8/1984 | Hadani | 350/538 |
| 4,468,101 | 8/1984 | Ellis | 350/538 |
| 4,483,587 | 11/1984 | Michon et al. | 350/174 |
| 4,572,625 | 2/1986 | Arndt et al. | 350/569 |
| 4,576,432 | 3/1986 | Rüger | 250/213 VT |

Primary Examiner—William H. Punter
Attorney, Agent, or Firm—Marvin N. Benn; Milton S. Gerstein

[57] ABSTRACT

The goggles include a pair of optical assemblies, each having two intersecting optical paths, including a see-through path with a large field of view on a straight line of sight to the viewed object, and a folded path which includes an objective lens set, an intensifier which converts visible and infrared light to a visible intensified light, and an eyepiece lens set, arranged in a loop in a plane perpendicular to the see-through path. Infrared and visible light from the viewed object enters both paths. A dichroic prism combiner at the intersection of the paths reflects intensified light from the folded path into the see-through path and transmits all other light. In one embodiment a dichroic prism separator is disposed at the intersection of the paths forward of the combiner for transmitting a portion of the incoming visible light along the see-through path and reflecting the remainder of the incoming light to the folded path. In another embodiment the entrance to the folded path is spaced from the see-through path.

26 Claims, 12 Drawing Figures

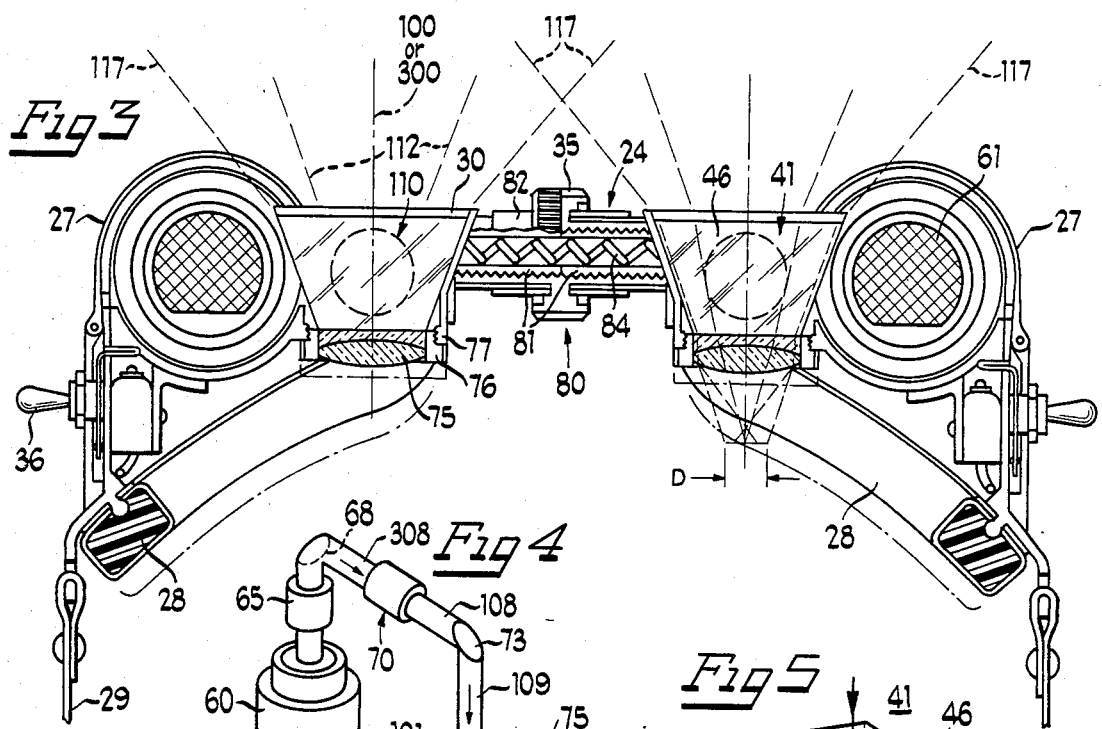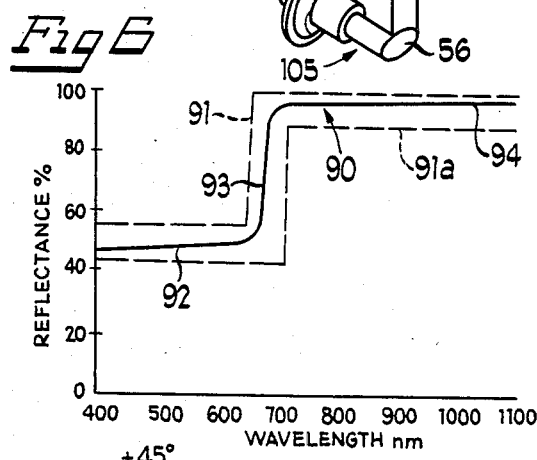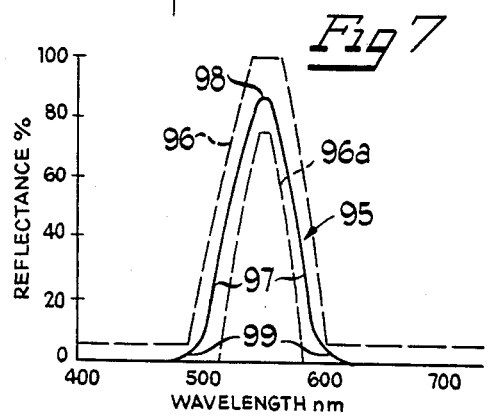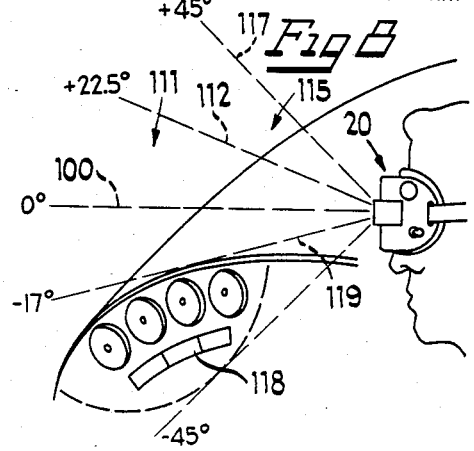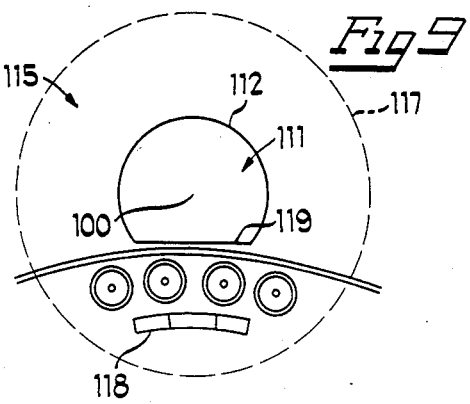

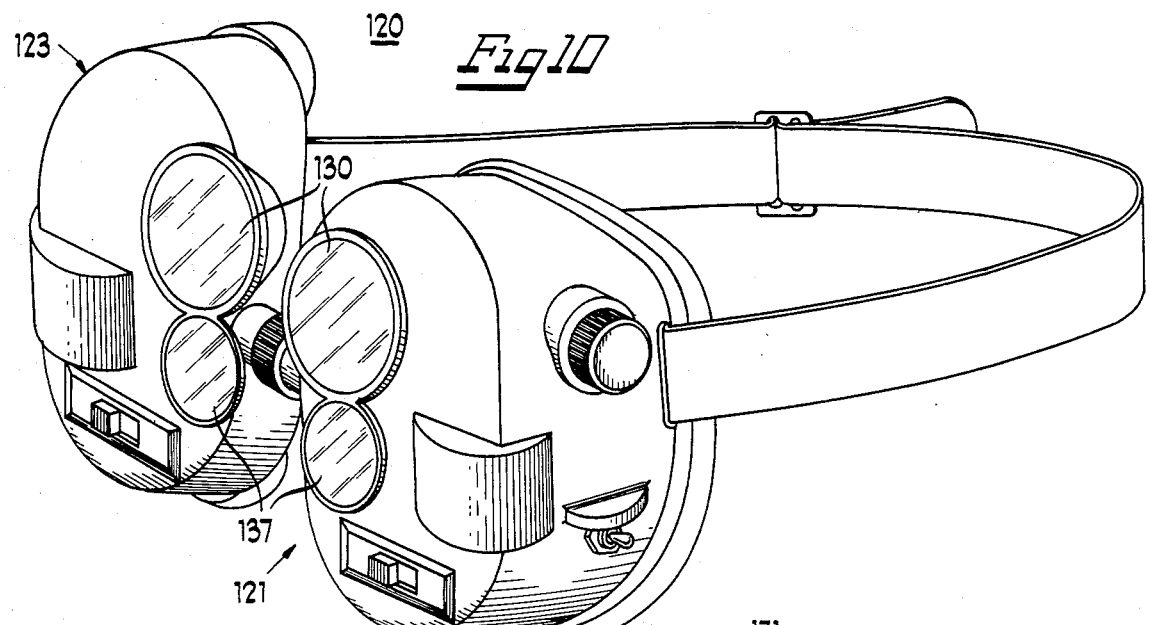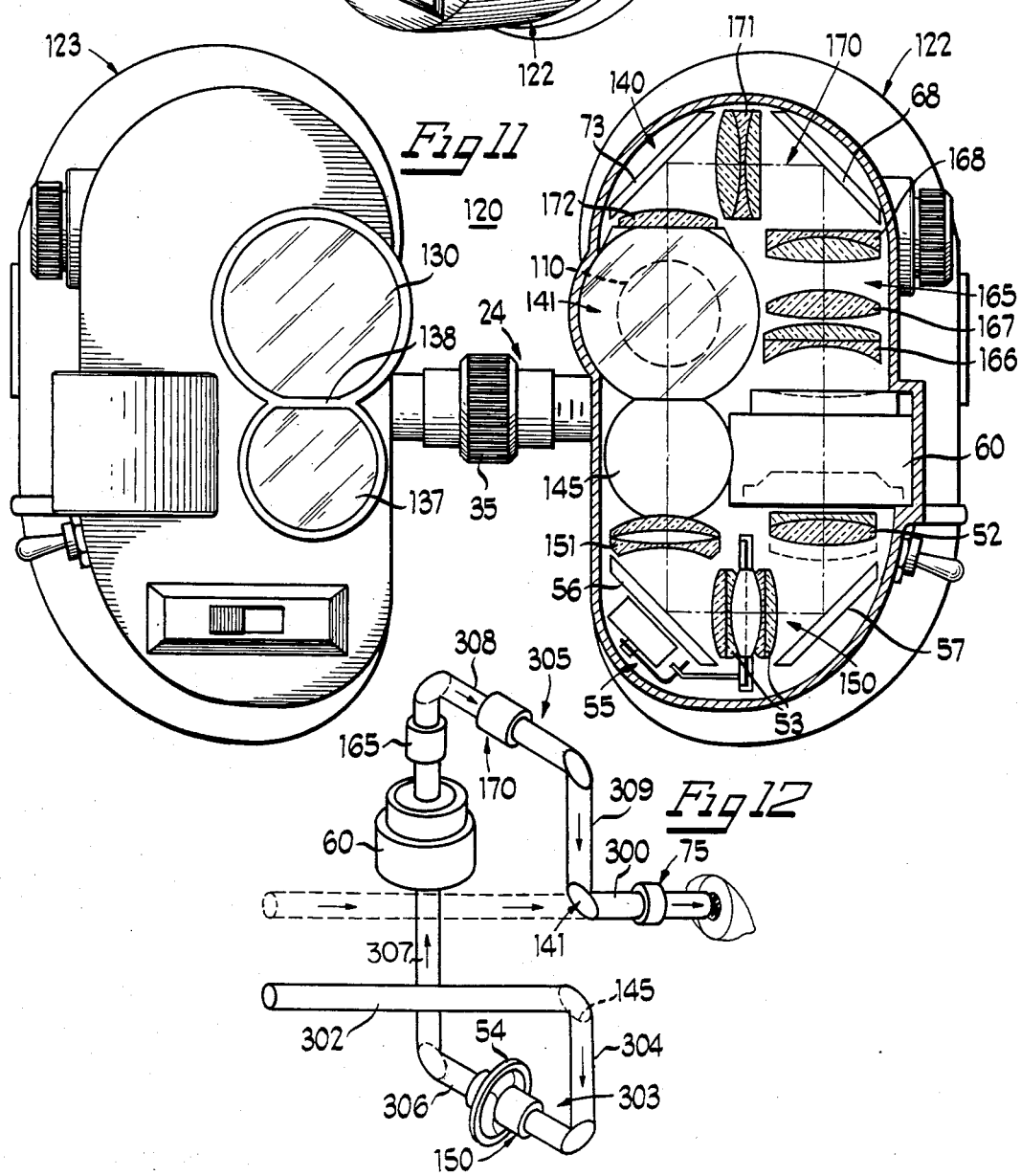

COMPACT SEE-THROUGH NIGHT VISION GOGGLES

BACKGROUND OF THE INVENTION

The present invention relates to night vision systems of the type which permit vision under very low light conditions by intensifying incoming infrared and/or visible light from a viewed object and converting it to an intensified visible light. The invention has particular application to night vision systems of the binocular goggles type, which can be mounted on a viewer's head covering his eyes.

Existing night vision goggles are heavy, cumbersome and unstable. They do not even resemble common goggles, but rather resemble television cameras mounted on the viewer's head, protruding more than 175 mm from the viewer's eye, and weighing as much as 850 grams. The weight and front-to-back length of such systems exert large moments on the viewer's head, causing serious instability problems and preventing effective use of the systems in application where the viewer's head is subjected to high gravitational or centrifugal loads.

Night vision systems typically include an objective lens set, an image intensifier and an eyepiece lens set, all arranged in a straight line. The lens design may be such as to result in an inverted image at the viewer's eye. Correction of this condition by the addition of a further inverting lens set would only add to the already excessive length of the system, aggravating the instability problem. Accordingly, the condition is corrected by the use of twisted fiber optics in the intensifier. But such twisted fiber optics have a greater overall optical length, result in a more costly image intensifier and impair the registration or alignment of the two binocular channels.

Additionally, existing night vision goggles cannot handle sudden excessive lighting conditions, such as flares or other bright lights. In such conditions, the goggles become inoperative and must be turned off. When the intensifier is turned off, most prior systems become opaque, rendering the viewer essentially blind. It is known to provide a night vision goggles wherein the main optical assembly is coupled to the user's eye through a periscope-type arrangement, the reflection to the viewer's eye being provided by a beam splitting prism which is transparent when the system is turned off, permitting the viewer to look past the main optical assembly. But such arrangements still suffer from all of the other disadvantages discussed herein.

Furthermore, prior systems have an extremely limited field of view with little or no peripheral vision. This renders such systems essentially useless for applications requiring peripheral vision, such as in police work or the like where the viewer is driving an automobile or other vehicle, and must be able to view the instrument panel without significant head movement.

SUMMARY OF THE INVENTION

It is a general object of the present invention to provide an improved night vision apparatus which avoids the disadvantages of prior devices while affording additional structural and operating advantages.

An important object of the present invention is to provide an image intensifying night vision apparatus which has relatively low mass and short front-to-back dimensions, resulting in improved stability.

Another object of the invention is the provision of a night vision system of the type set forth which also has a see-through capability which renders the system substantially transparent when the intensifier is turned off.

In connection with the foregoing objects, it is another object of the invention to provide a night vision system of the type set forth, which provides a peripheral transparent or see-through field of view when the intensifier is turned on.

Yet another object of the invention is the provision of night vision system which remains operative in sudden high light conditions.

In connection with the foregoing objects, it is still another object of the invention to provide a night vision apparatus of the type set forth, which affords these advantages while permitting use of straight fiber optics in the intensifier These and other objects of the invention are attained by providing in night vision apparatus for receiving at an entrance plane visible and infrared light from a viewed object and forming an intensified image of the object along a viewing axis of a viewer's eye, the improvement comprising: means defining an optical path from the entrance plane to the viewer's eye, the optical path having a first portion which lies along the viewing axis and a second portion which is entirely non-parallel to said first portion and image intensifying means disposed in the second portion of the optical path.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings a preferred embodiments thereof, from an inspection of which, when considered in connection with the following description, the invention, its construction and operation, and many of its advantages should be readily understood and appreciated.

FIG. 3 is a view in horizontal section taken along the line 3—3 in FIG. 2;

FIG. 4 is a diagrammatic view of the optical assembly and paths therethrough in the right-hand portion of the goggles of FIG. 1;

FIG. 5 is a perspective view of the dichroic prism set of the goggles of FIG. 1;

FIG. 6 is a graph of the reflectance characteristic of one of the dichroic surfaces of the prism set of FIG. 5;

FIG. 7 is a graph of the reflectance characteristic of the other dichroic surface of the prism set of FIG. 5;

FIG. 8 is a side elevational view of the goggles of FIG. 1 mounted on the head of the user, illustrating the intensified and transparent fields of view;

FIG. 9 is a front view of the fields of view illustrated in FIG. 8;

FIG. 10 is a view similar to FIG. 1, illustrating goggles in accordance with a second embodiment of the present invention;

FIG. 11 is a view similar to FIG. 2, illustrating the goggles of FIG. 10; and

FIG. 12 is a diagrammatic view, similar to FIG. 4, illustrating the optical assembly and paths therethrough of the right-hand portion of the goggles of FIG. 10.

DESCRIPTION OF THE PREFERRED EMBODIMENTS

Figure 1:
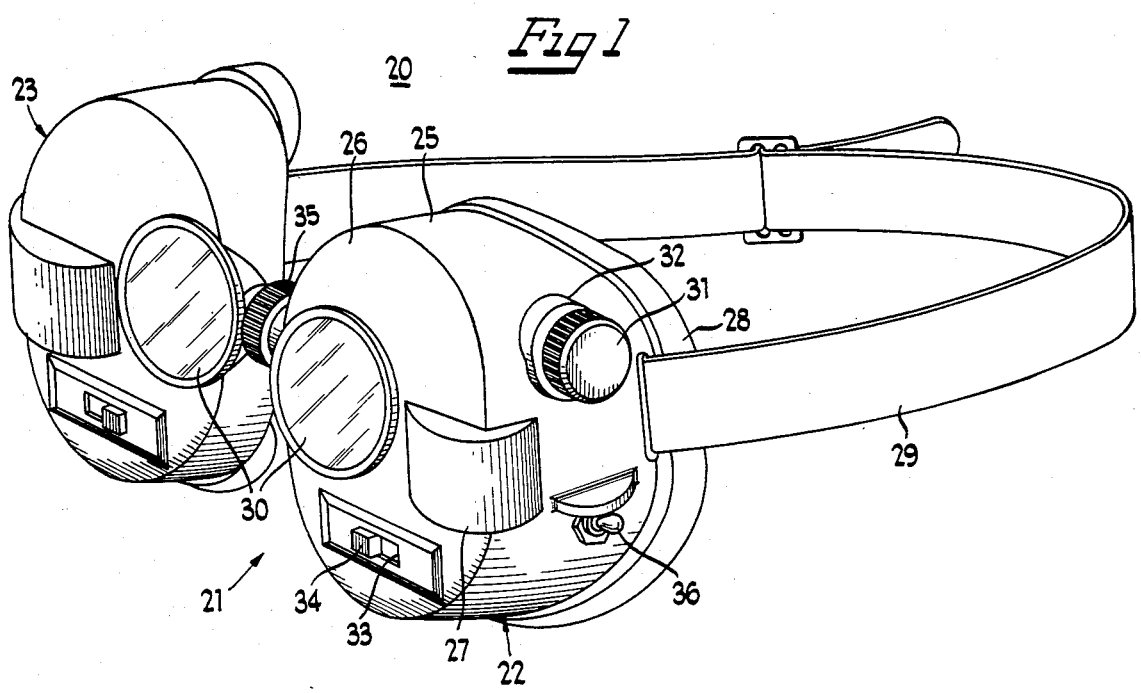
FIG. 1 is a perspective view of night vision goggles constructed in accordance with and embodying the features of a first embodiment of the present invention.
Figure 2:
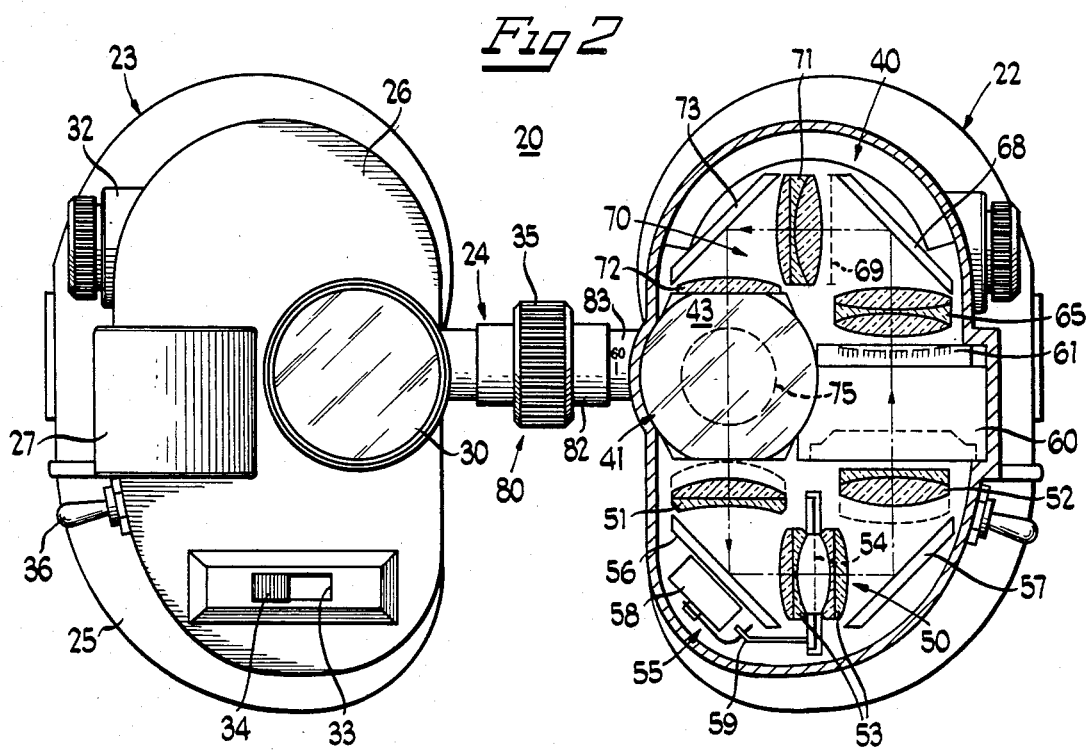
FIG. 2 is a front elevational view in partial vertical section of the goggles of FIG. 1.

Referring to FIGS. 1-3, there is illustrated a pair of night vision goggles, generally designated by the numeral 20, constructed in accordance with and embodying the features of a first embodiment of the present invention. The goggles 20 include a housing assembly 21 which comprises a pair of housings 22 and 23 arranged for respectively covering the left and right eyes of a viewer and interconnected by a bridge 24. The housings 22 and 23 are constructed as mirror images of each other, and each includes an encompassing peripheral side wall 25 closed at the front end thereof by a flat planar front wall 26. A part-cylindrical portion 27 projects forwardly and laterally outwardly from the housing generally centrally of the junction between the outer side edge of the front wall 26 and the peripheral side wall 25. The rear edge of the peripheral side wall 25 is provided with a face cushion 28 of suitable resilient material, such as a foam rubber or the like. The face cushion 28 extends around substantially the entire perimeter of the side wall 25 except for the inner side edge thereof adjacent to the wearer's nose. The rear ends of the housing 22 and 23 are interconnected by a head strap 29 for mounting the goggles 20 on the viewer's head in standard fashion, with the housings 22 and 23 respectively covering the viewer's eyes, as indicated in FIG. 8.

Each of the housings 22 and 23 also has a circular input window 30 in the front wall 26 thereof adjacent to the inner side edge thereof, the window 30 being formed of a suitable transparent material such as glass or plastic. A battery cartridge 31 is mounted in a battery receptacle boss 32 on the outer side of the peripheral side wall 25. A rectangular slot 33 is formed in the front wall 26 adjacent to the lower end thereof and slidably receives a focusing knob 34 for providing continuous focusing of certain optical components of the goggle 20, as will be explained more fully below. The bridge 24 carries a knurled control wheel 35, the function of which will be explained below, and a power switch 36 is mounted on the peripheral side wall 25 for selectively connecting and disconnecting the battery cartridge 31 from an optical assembly 40 mounted within the housing 22 or 23.

Referring now more particularly to FIGS. 2, 3 and 5, each of the housings 22 and 23 contains an optical assembly 40. The two assemblies 40 are arranged as mirror images of each other, the optical assembly 40 for the left eye housing 22 being illustrated in FIG. 2. The optical assembly 40 includes a separating/combining prism set 41, which is diagrammatically illustrated in FIG. 5. The prism set 41 includes a separating prism 42 and a combining prism 46, each being of the dichroic beam splitting type. More specifically, the separating prism 42 includes an input surface 43, a separating surface 44 and an output surface 45, whereas the combining prism 46 includes an input surface 47, a combining surface 48 and an output surface 49.

The prisms 42 and 46 are arranged so that the separating and combining surfaces 44 and 48 are disposed in facing parallel relationship with a predetermined small gap therebetween to avoid interference with visible light transmission. In this configuration, the input surface 43 is arranged parallel to the output surface 49, while the input surface 47 is arranged parallel to the output surface 45. While, for clarity of illustration, the prisms 42 and 46 have been diagrammatically illustrated with rectangular surfaces in FIG. 5, it will be appreciated that, in practice, the prism set 41 has a somewhat conical configuration, with the input surface 43 and the output surface 49 being substantially circular in shape, and the input surface 47 being generally trapezoidal in shape, as indicated in FIGS. 2 and 3, with the input surface 43 disposed immediately behind the window 30.

In practice, incoming visible and infrared light from a viewed object enters the prism set 41 through the input surface 43 the separating surface 44, a portion of the light is transmitted to the combining prism 46 and out through the output surface 49, while the remainder of the light is reflected out through the output surface 45. In like manner, when light enters the input surface 47, upon striking the combining surface 48, a portion is transmitted to the prism 42 and out through the output surface 45, while another portion is reflected out through the output surface 49.

The optical assembly 40 also includes an objective lens set 50 of separated groups, including lens groups 51 and 52 and a pair of lens groups 53 separated by an iris 54 of an automatic light control assembly 55. A mirror 56 is disposed between the lens group 51 and one of the lens groups 53, while another mirror 57 is disposed between the other lens group 53 and the lens group 52, so that the optical path is in the direction indicated by the arrows in FIG. 2. The automatic light control assembly 55 includes a motor 58 electrically connected to the battery cartridge 31 and mechanically connected by a linkage 59 to the iris 54. The motor 58 is also electrically connected to an image intensifier 60 which is mounted adjacent to the lens group 52. The image intensifier 60 is of standard construction, and includes circuitry for sensing the intensity of the light passing therethrough and providing to the motor 58 a feedback signal proportional to such intensity. For intensities above a predetermined level, the motor 58 will be actuated to close the iris 54 a sufficient amount to reduce the light passing therethrough to an acceptable level.

The image intensifier 60 is preferably an 18 mm Microchannel wafer-type image intensifier, with a straight fiber optics output window 61. In operation, the image intensifier 60 receives incoming visible and infrared light from the objective lens set 50 and intensifies it, converting it to a visible output light in a predetermined narrow band of wave lengths. In a preferred embodiment, the output light from the image intensifier 60 is emitted by a green phosphor, producing a visible band of light which is known as "P-20" light, although it will be appreciated that image intensifiers 60 producing other output wave lengths could also be used.

The output from the image intensifier 60 is applied to a relay lens group 65, producing a secondary image which is reflected from a mirror 68 to an image plane 69. This image then passes through an eyepiece lens set 70, which includes a lens group 71 and a plano convex lens 72, a mirror 73 being interposed therebetween. The output of the eyepiece lens set 70 then passes into the combining prism 46 through the input surface 47 thereof.

The optical assembly 40 also includes a diopter adjusting lens 75 (FIG. 3) which is preferably a lens group and is carried in a circular holder 76, which is threadedly engaged in the rear end of a generally conical housing receptacle 77 in the housing 22 (or 23). The diopter adjusting lens 75 is, therefore, disposed immediately adjacent to the output surface 49 of the combining prism 46, and may readily be replaced with other adjusting lenses, depending upon the diopter requirement of the particular viewer's eye.

The bridge 24 carries an interpupillary adjustment assembly 80 which includes a pair of coaxial, externallly threaded inner tubes 81, respectively connected to the housings 22 and 23, and an internally threaded outer tube 82 which is threadedly engaged with each of the inner tubes 81 and is encircled by and fixedly secured to the knurled control wheel 35. Preferably, a micrometer scale 83 is imprinted on the outer surface of one or both of the inner tubes 81 to indicate the interpupillary distance between the optical assemblies 40. Disposed within the inner tubes 81 is a helical wound electrical wire 84 which powers both housings 22 and 23 from one electrical switch 36. By rotation of the outer tube 82 by use of the knurled wheel 35, the inner tubes 81 are moved axially toward and away from each other to vary the interpupillary distance to match that of the particular viewer who will be wearing the goggles 20.

The reflectance characteristic of the coating on the separating surface 44 of the prism 42 is illustrated in FIG. 6, which is a plot of percent reflectance against wave length in nanometers. The reflectance characteristic is indicated by the curve 90, which lies in a range between upper and lower limits designated, respectively, by the broken lines 91 and 91a, depending upon the quality of the dichroic coating on the separating surface 44. It can be seen that the separating surface 44 reflects approximately 50% of the wave lengths in the visible spectrum, between about 400 and 700 nm, as indicated by the generally horizontal portion 92 of the curve 90, the remainder of the incident visible light being transmitted through the separating surface 44. The curve 90 has a substantially vertical portion 93 at about 700 nm, all higher wave lengths being substantially completely reflected, as indicated by the upper portion 94 of the curve 90. These wave lengths above 700 nm represent the infrared portion of the spectrum and, in practice, between 90% and 100% of the incident infrared light is reflected by the separating surface 44, depending upon the quality of the dichroic coating thereon. Any unreflected infrared light is, of course, transmitted through the separating surface 44. Preferably, the dichroic coating is selected so that at least 50% of the visible light is transmitted.

The reflectance characteristic of the coating on the combining surface 48 is illustrated in FIG. 7 by the curve 95, which lies in a range between upper and lower limits respectively designated by the broken-lines 96 and 96a. The combining surface 48 selectively reflects a narrow band of wave lengths less than 100 nm in width, between the steep sides 97 of the curve 95, the band being centered at 550 nm at the peak 98, which is the wave length of the P-20 light emitted from the image intensifier 60. It can be seen that between 75% and 100% of this P-20 light at the peak 98 will be reflected, depending upon the quality of the dichroic coating on the combining surface 48. Wave lengths below 500 nm and above 600 nm are substantially completely transmitted through the combining surface 48, as indicated by the feet 99 of the curve 95. However, since only P-20 light is emitted from the image intensifier 60, therefore only P-20 light enters the input surface 47 of the prism 46, substantially all of this light being reflected out through the output surface 49. In order to prevent the small portion of P-20 light that is transmitted through the combining surface 48 from entering the objective lens set 50, a pair of polarizing filters (not shown) could be applied respectively on the input surface 47 and the output surface 45.

The approximately 50% of the visible light transmitted through the separating surface 44 will suffer some additional loss in passing through the combining surface 48. However, this loss can be minimized by the use of a holographically formed coating on the combining surface 48 by techniques known to those skilled in the art.

Referring now in particular to FIGS. 2, 3 and 4, the operation of the optical assembly 40 will be explained in detail. FIG. 4 shows a diagrammatic representation of the optical assembly 40 and the light paths therethrough for the right eye housing 23, but it will be appreciated that the corresponding diagram for the optical assembly 40 in the left eye housing 22 would simply be a mirror image. The entire spectrum of light from the viewed object, including visible and infrared light, enters the optical assembly 40 at an entrance plane defined by the window 30. This light enters along a see-through path 100 having a front portion 101 forward of the prism set 41 and a rear portion 102 rearward of the prism set 41. It can be seen that the see-through path 100 is a straight-line path along the viewing axis of the viewer's eye, which lies along the line of sight from the viewer's eye to the viewed object.

When this light strikes the separating surface 44 of the separating prism 42, approximately 50% of the visible light and virtually all of the infrared light is reflected downwardly along a vertical leg 104 of a folded intensified light path 105, which defines a loop lying in plane substantially perpendicular to the see-through path 100. The reflected light in the folded path 105 is reflected from the mirror 56 along a horizontal leg 106 and then from the mirror 57 into a vertical leg 107, in the direction indicated by the arrows in FIG. 4. The objective lens set 50 is, for convenience, diagrammatically illustrated in the leg 106 although, as can be seen from FIG. 2, the objective lens set 50 actually includes separated lens groups which are disposed on either side of the mirrors 56 and 57.

The light that is reflected into the leg 107 passes through the image intensifier 60, being converted to an intensified P-20 light, which then passes through the relay lens group 65. The output from the relay lens group 65 passes through the eyepiece lens set 70 to the input surface 47 of the combining prism 46, being reflected en route by the mirror 68 into a hoirzontal leg 108 and thence by the mirror 73 to a descending leg 109 of the path 105. While, for convenience, the eyepiece lens set 70 is diagrammatically illustrated in the leg 108, it will be understood that it comprises separated elements which are disposed on either side of the mirror 73.

When the P-20 light arrives at the combining surface 48 of the prism 46, it is substantially all reflected into the rear portion 102 of the see-through path 100 through the output surface 49, joining the approximately 50% of the visible light which was transmitted through the separating prism 42. This combined light is then passed through the diopter adjustment lens 75 to the viewer's eye.

The purpose of the relay lens group 65 is to invert the image from the image intensifier 60 to complement an inversion effected by the objective lens set 50, thereby insuring that an erect image will be presented to the viewer's eye. Alternatively, it will be appreciated that twisted fiber optics could be used in the image intensifier 60 to effect the necessary image inversion, although this has attendant disadvantages, as explained above.

It is a fundamental aspect of the present invention that the unique arrangement of the optical assemblies 40 results in goggles 20 with significantly reduced front-to-back dimensions. More particularly, most of each optical assembly 40 is arranged in the folded path 105 which lies in a plane disposed perpendicular to the viewing axis. The only optical components disposed along the viewing axis are the separating/combining prism set 41 and the diopter adjusting lens 75. This results in a goggles housing assembly 21 which has a total front-to-back depth of only about 70 mm as opposed to prior art devices with depths in excess of 175 mm. Additionally, the total weight of the goggles 20 is only about 350 grams, as opposed to weights between 650 and 850 grams for prior night vision goggles. The significantly reduced mass and depth of the goggles 20 results in a vastly reduced moment relative to the viewer's eye of about 730 g/cm, as compared with moments of about 6000 g/cm for prior goggles. Thus, the present invention provides greatly enhanced stability in use.

Another significant feature of the invention is that it offers the aforementioned stability, while at the same time providing a see-through capability. Thus, the use of beam splitting prisms 42 and 46 in the see-through path 100 along the viewing axis which are at least 50% transparent to visible light, permits a viewer to see through the goggles 20 even when the image intensifiers 60 are turned off. Accordingly, the viewer can turn on the image intensifiers 60 only when they are needed, thereby significantly reducing power consumption and battery drain.

Furthermore, another significant aspect of the invention is that the optical assemblies 40 are designed so that the transparent or see-through field of view is significantly greater than the intensified field of view, thereby affording the viewer significant unintensified peripheral vision, when the image intensifiers 60 are turned on. Referring in particular to FIGS. 3, 8 and 9, the size of the output area of the image intensifier 60 (about 18 mm) and the focal length of the eyepiece lens set 70 are such that there is formed on the input surface 47 of the combining prism 46 on intensified image area 110 (FIG. 3). This affords a circularly conical intensified image field of view 111 of substantially 45°. More specifically, the intensified image field of view 111 has a substantially conical boundary 112 which is substantially coaxial with the viewing axis along the see-through path 100. This is about the same angle intensified field of view as is afforded by prior night vision goggles.

However, the prism set 41 is designed with external dimensions such as to provide a transparent image field of view 115 which is substantially greater than the intensified image field of view 111. More particularly, the transparent image field of view 115 is coaxial with the intensified image field of view 111 and has a circularly conical outer boundary 117 with a conical angle of at least 80°, and preferably 90°. Thus, the conical angle of the transparent image field of view 115 is approximately twice that of the intensified image field of view 111, affording transparent or see-through vision extending 45° above and below the viewing axis.

It will be appreciated that the area between the outer boundary 112 of the intensified image field of view 111 and the outer boundary 117 of the transparent image field of view 115 affords an annular peripheral vision field of view. This peripheral vision field of view is adequate, for example, to permit the viewer to see an instrument panel 118 of an automobile or the like, by a simple movement of the eyes, when the intensified image field of view 111 is directed through the vehicle windshield. In this regard, the fiberoptic output window 61 of the image intensifier 60 may be truncated, as indicated in FIG. 3, to produce a cutoff lower edge 119 of the intensified image field of view 111 (FIGS. 8 and 9) to prevent the intensified image field of view from overlapping objects, such as the instrument panel 118, in the peripheral vision field of view. In the preferred embodiment, the cutoff lower edge 119 is positioned so that the intensified image field of view 111 extends approximately 17° below the viewing axis. It will be understood that, when the image intensifier 60 is turned off, the entire transparent image field of view 115 is transparent to approximately 50% of the incoming visible light from the viewed object.

Another aspect of the invention is that the automatic light control assembly 55 insures that the goggles 20 will be operative in sudden excessive lighting conditions, such as in the presence of flares or the like. Thus, as soon as the excessive lighting condition is sensed by the image intensifier 60, it sends a feedback signal to the motor 58 for closing the iris 54 the necessary amount. In the preferred embodiment the automatic light control assembly 55, which is of known construction and may be of the type used in SLR and movie cameras, has a minimum aperture ratio of 1,000:1. In addition, the optical assembly 40 could be designed to provide anti-laser protection. Thus, one or more of the optical elements in the folded path 105 may be made of Schott KG-3 glass, which is capable of absorbing up to 99.9% of 1064 nm laser energy.

In the preferred embodiment of the invention, the optical assembly 40 is designed to have a magnification of 1.0X and resolution of 0.61 lines per milliradian, and the focus range of the objective lens set 50 is from 25 cm to infinity. The objective lens set 50 forms a lens with an aperture of f/1.2 and and with an effective focal length of 21.7 mm. The eyepiece lens set 70 has an effective focal length of 22.8 mm and an exit pupil diameter D (FIG. 3) of 7.5 mm. While, in the preferred embodiments, particular arrangements of lens elements and lens groups have been disclosed for the objective lens set 50, the relay lens group 65 and the eyepiece lens set 70, it will be appreciated by those skilled in the art of optical design that comparable results could be achieved with various alternative designs incorporating different numbers and types of lens elements and groups.

The diopter adjustment is preferably between +2 and −6 diopter. The interpupillary distance is adjustable between 51 and 72 mm and the eye relief, i.e., the axial distance between the viewer's eye and the diopter adjusting lens 75, is 13 mm when the goggles 20 are properly seated over the viewer's eyes. The overall dimensions of the goggles 20 are 95 mm height×160 mm width×70 mm depth, and they protrude only 40 mm from the viewer's eye.

Referring now to FIGS. 10–12, there is illustrated another embodiment of the goggles of the present invention, generally designated by the numeral 120. The goggles 120 are similar to the goggles 20 and common parts bear the same reference numerals. The goggles 120 include a housing assembly 121 having left and right eye housings 122 and 123 which are fundamentally the same as the housings 22 and 23 described above, except that they have a slightly greater height, preferably about 110 mm. Each of the housing 122 and 123 has a large input window 130 which is substantially the same as the input windows 30 described above, and immediately therebelow a small input window 137. The windows 130 and 137 preferably overlap slightly along a truncation line 138.

Each of the housings 122 and 123 has an optical assembly 140, which differs in only a few respects from the optical assemblies 40 described above. More particularly, the optical assembly 140 includes a mirror 145 immediately behind the input window 137 for reflecting all of the incoming light downwardly to an objective lens set 150, which is substantially the same as the objective lens set 50 described above, except that its first element is a lens group 151. The optical path then proceeds through the image intensifier 60 to a relay lens set 165 comprising a plurality of separated elements 166, 167 and 168. The relay lens set 165 serves the same function as the relay lens group 65, above, i.e., to invert the image from the image intensifier 60. The optical path then extends through an eyepiece lens set 170, which includes a lens group 171 between the mirrors 68 and 73, and a plano-convex lens element 172. Immediately beneath the lens element 172 and behind the input window 130 is a combining prism set 141 which is substantially identical to the prism set disclosed above with respect to FIGS. 1–4, except that it has no coating on the surface 44.

Referring to FIGS. 11 and 12, it can be seen that the optical paths formed by the optical assembly 140 are slightly different from those formed by the optical assembly 40. More particularly, there is a straight-line, see-through path 300 along the viewing axis which passes through the input window 130 and the prism set 141 and the diopter adjustment lens 75 to the viewer's eye. It will be appreciated that both visible and infrared light passes along this path 300, but the infrared light is not visible to the viewer.

The full spectrum of visible and infrared light from the viewed object also enters the input window 137 to a straight line portion 302 of an intensified light path 305, which is disposed substantially parallel to the see-through path 300, but is spaced therefrom a predetermined distance, preferably about 20 mm. All of this light is reflected by the mirror 145 into a folded portion 303 of the path 305, which includes legs 304, 306, 307, 308 and 309, all lying in a plane disposed substantially perpendicular to the see-through path 300. It will be noted that the objective lens set 150 and the eyepiece lens set 170 are, respectively, diagrammatically shown in the legs 306 and 308 of FIG. 12, although it will be appreciated that the actual positions of the lens elements are as illustrated in FIG. 11. In operation, the visible and infrared light in the intensified light path 305 is converted by the image intensifier 60 to P-20 light, which is reflected by the prism set 141 into the see-through path 300 and to the eye of the viewer.

Except as just indicated, the operation of the goggles 120 is exactly the same as was described above for the goggles 20. The housing assembly 121 is slightly larger than the housing assembly 21, but the optical assembly 140 is more efficient than the optical assembly 40, since the full spectrum of light from the viewed object passes through the image intensifier 60. The slight separation of the see-through path 300 from the straight-line portion 302 of the intensified light path 305 may cause some parallax at close-up viewing, but the effect is very minimal.

The optical characteristics of the optical assembly 140 are substantially the same as those described above for the optical assembly 40, except for the aperture of the objective lens set 150. The slightly larger housing assembly 121 weighs approximately 400 grams, resulting in a moment relative to the viewer's eye of 850 g/cm.

From the foregoing, it can be seen that there has been provided an improved night vision goggles which has very low mass and front-to-back depth, resulting in increased stability, and which nevertheless affords see-through vision when the intensifier is off and substantial peripheral see-through vision when the intensifier is on, the goggles also remaining operable in sudden excessive light conditions.

I claim:

1. Night vision apparatus comprising: input means for receiving visible and infrared light from a viewed object and directing the light along two intersecting optical paths, one of said paths lying entirely along a straight line, and the other of said paths having a folded portion which is entirely non-parallel to said one path, intensifying means disposed along said folded portion of said other path for converting the visible and infrared light therein to a visible intensified light, and means at the intersection of said paths for combining said intensified light with light in said one path, said combining means having a field of view for the light in said one path which is substantially greater than the field of view for said intensified light.

2. The night vision apparatus of claim 1, wherein said folded portion of said other path defines a loop which lies in a plane disposed substantially perpendicular to said one path.

3. The night vision apparatus of claim 1, wherein said other path has an input portion disposed substantially parallel to said one path.

4. The night vision apparatus of claim 1, wherein said combining means reflects said intensified light into said one path.

5. The night vision apparatus of claim 1, wherein said two fields of view are substantially circular and concentric, a non-overlapping portion of the larger field of view defining a peripheral vision field of view for unintensified visible light from the object.

6. The night vision apparatus of claim 1, and further including objective lens means and eyepiece lens means disposed in said folded portion of said other path respectively forwardly and rearwardly of said intensifying means.

7. The night vision apparatus of claim 1, and further including diopter adjustment means disposed in said one path rearwardly of said combining means.

8. Night vision apparatus comprising: input window means for receiving incident visible and infrared light from a viewed object and directing the light along a first linear path, separating means disposed in said first path for transmitting therealong a portion of the incident visible light and for reflecting the remaining portion of the visible light and substantially all of the incident infrared light into a second path which intersects said first path, intensifying means disposed along said second path for converting the visible and infrared light therein to a visible intensified light, and combining means disposed at the intersection of said first and second paths for transmitting along said first path the unintensified portion of the incident visible light therein and for reflecting the intensified light into said first path rearwardly of said separating means.

9. The night vision apparatus of claim 8, wherein each of said separating means and said combining means comprises a dichroic prism.

10. The night vision apparatus of claim 9, wherein each of said dichroic prisms has a dichroic coated surface, said coated surfaces being substantially parallel and spaced apart a predetermined slight distance.

11. The night vision apparatus of claim 9, wherein said dichroic prism of said separating means transmits at least 50% of the incident visible light and reflects between 90% and 100% of the incident infrared light, said intensified light lying in a predetermined relatively narrow band of wave lengths, said dichroic prism of said combining means reflecting substantially all of the intensified light and transmitting substantially all the light outside said predetermined band.

12. The night vision apparatus of claim 8, wherein said second path is a folded path.

13. The night vision apparatus of claim 12, and further including objective lens means and eyepiece lens means disposed along said second path respectively forwardly and rearwardly of said intensifying means.

14. The night vision apparatus of claim 13, and further including inverting lens means disposed between said intensifying means and said eyepiece lens means for inverting the image from said intensifying means.

15. Night vision apparatus comprising: input means for receiving invisible and infrared light from a viewed object and directing the light along two intersecting optical paths, one of said paths lying entirely along a straight line and the other of said paths having a folded portion which is entirely non-parallel to said one path, intensifying means disposed along such folded portion of said other path for converting the visible and infrared light therein to a visible intensified light, means at the intersection of said paths for combining said intensified light with the light in said one path, and automatic light control means disposed in said other path forwardly of said intensifying means and electrically coupled thereto and responsive to a feedback signal therefrom the automatically reducing the amount of light transmitted to said intensifying means when the intensified light exceeds a predetermined level.

16. In a night vision apparatus for receiving at an entrance plane visible and infrared light from a viewed object and forming an intensified image of the object along a viewing axis of a viewer's eye, the improvement comprising: a main housing, a pair of optical assemblies mounted by said main housing, one said optical assembly for one said eye of the user, each of said pair of optical assemblies comprising means defining a first optical path along the viewing axis from the entrance plane to the viewer's eye, means defining a second optical path from the entrance plane and intersecting said first path, said second path comprising a folded portion lying substantially in a vertical plane perpendicular to said first optical path and comprising intensifying means disposed therein for converting the visible and infrared light therein to a visible intensified light, said folded portion having a first vertically extending leg portion, a second horizontally extending leg portion, and a third vertically extending leg portion parallel to said first leg portion, said second leg portion interconnecting the upper ends of said first and third vertically extending leg portions, said first vertically extending leg portion mounting therein said image intensifying means and being positioned on the side of its respective said optical assembly facing away from the other said optical assembly so that said image intensifying means thereof is positioned laterally outwardly of the user's eye associated with the respective said optical assembly in order to provide a very compact and relatively non-protruding goggles system, said third vertically extending leg portion having a lower end that intersects said first optical path at right angles thereto, and combining means disposed at said intersection of said third leg portion and said first optical path for reflecting said intensified light from said second path into said first path towards the viewer and for transmitting therethrough the visible light from said first path directly to the user's eye; and eyepiece means in line with said first optical path and rearward of said combining means along the path of the combined light for imaging the combined light onto the respective eye of the user.

17. The night vision apparatus of claim 16, wherein said combining means comprises a dichroic prism.

18. The night vision apparatus of claim 16, wherein said second path has an input portion disposed substantially parallel to said first path, said folded portion lying in a plane disposed substantially perpendicular to said first path.

19. The night vision apparatus of claim 16, and further including objective lens means and eyepiece lens means disposed in said folded portion of said second path respectively forwardly and rearwardly of said intensifying means.

20. The improvement according to claim 16, wherein said second path further comprises a fourth vertically extending leg portion and a fifth horizontally extending leg portion, said fourth leg portion having a first upper end through which light to be intensified enters, and a second lower end, said fifth leg portion having a first end connected to said second lower end of said fourth leg portion and a second end connected to the lower end of said first vertically extending leg portion in which is mounted said image intensifying means; said second optical path further comprising an objective lens means, said objective lens means comprising a first lens means mounted in said fourth vertically extending leg portion, a second lens means spaced from said first lens means and mounted in said fifth horizontally extending leg portion, and a third lens means spaced from said second lens means and mounted in said first vertically extending leg portion forward of said image intensifying means for imaging the light in said leg portions onto the input surface of said image intensifying means.

21. In night vision binocular goggles for receiving at an entrance plane visible and infrared light from a viewed object and forming intensified images of the object along viewing axes of the viewer's eyes, the improvement comprising: a goggle housing adapted to be fitted over the eyes of the viewer; and at least one optical assembly mounted in said housing for respectively directing incident visible and infrared light from the viewed object to the eyes of the viewer, said at least one optical assembly including means defining an optical path from the entrance plane to the viewer's eye, said optical path having a first portion which lies along the corresponding viewing axis, and a second portion which is entirely non-parallel to said first portion, and image intensifying means disposed in said second portion of said optical path; said at least one optical assembly including means defining a first field of view for light from said image intensifying means, said optical assembly including means defining a second field of view for the light in said first portion of said paths substantially greater than said first field of view.

22. The goggles of claim 21, wherein said second portion of said path is folded and lies in a plane disposed substantially perpendicular to the viewing axis.

23. The goggles of claim 21, wherein each of said optical assemblies includes objective lens means and eyepiece lens means disposed in said second portion of said path respectively forwardly and rearwardly of said image intensifying means.

24. The goggles of claim 23, wherein each of said optical assemblies includes diopter adjustment means.

25. The goggles of claim 23, and further including means carried by said housing and coupled to each of said optical assemblies for adjusting the interpupillary distance therebetween.

26. The goggles of claim 21, wherein said first and second fields of view are substantially circular and concentric.

* * * * *